United States Patent [19]
Dielacher et al.

[11] 3,960,703
[45] June 1, 1976

[54] PROCESS FOR THE PURIFICATION OF SLACK WAXES

[75] Inventors: Maximilian Dielacher, Hamburg; Uwe Hansen, Jesteburg, both of Germany

[73] Assignee: Deutsche Texaco Aktiengesellschaft, Hamburg, Germany

[22] Filed: Dec. 20, 1974

[21] Appl. No.: 534,962

[30] Foreign Application Priority Data

Dec. 22, 1973 Germany............................ 2364333

[52] U.S. Cl.............................. 208/26; 208/310 R
[51] Int. Cl.².......................................... C10G 43/02
[58] Field of Search........... 208/26, 310; 260/676 R, 260/676 AD

[56] References Cited

UNITED STATES PATENTS

| | | | |
|---|---|---|---|
| 2,487,805 | 11/1949 | Hermanson......................... | 208/310 |
| 2,574,434 | 11/1951 | Greentree et al..................... | 208/26 |
| 3,395,097 | 7/1968 | Senn................................... | 208/310 |
| 3,409,691 | 11/1968 | Small.............................. | 260/676 R |

*Primary Examiner*—Herbert Levine
*Attorney, Agent, or Firm*—T. H. Whaley; C. G. Ries; William E. McNulty

[57] ABSTRACT

Aromatic compounds can be separated from slack wax in a continuous cyclic process using a macroporous metal ion loaded cation exchange resin involving successive steps of adsorption, purge, desorption and purge.

16 Claims, No Drawings

PROCESS FOR THE PURIFICATION OF SLACK WAXES

BACKGROUND OF THE INVENTION

The present invention relates to the separation of aromatic compounds from slack wax, such as that obtained in urea and solvent dewaxing processes, using a macroporous metal ion loaded cation exchange resin.

There has been an increasing demand for n-paraffins for use in the petrochemical industry, e.g., for the production of bio-degradable detergents, long-chain alcohols, plasticizers etc. Other applications of n-paraffins include the production of proteins which has been carried out on a large scale in the past few years. The two principal steps of all petro-protein production processes consist in the fermentation and subsequent recovery of the protein-containing cells. Processes using methane and other gaseous hydrocarbons consist of these two stages, while in processes using liquid hydrocarbons as the nutrient solution further process steps have to be added for the production of pure n-paraffin, such as an additional purification step as the last step of the process, particularly when gas oil or other crude oil fractions are employed as the feed. The degree of purity of the charge is of vital importance when considering the economy of such processes.

Petroprotein manufacturers are not alone in setting high standards for the purity of the n-paraffin charge materials; other manufacturers, too, require greater purity of the n-paraffins, and food regulations insist on the removal of impurities, e.g., removal of aromatic compounds in case the paraffins are processed in the food industry for use in packaging material or coating of milk containers or for other applications, e.g. chewing gum, or for use as petroleum jelly according to DAB VII (Deutsches Aerztebuch VII — German Manual for Pharmacists and Pharmaceutical Industry) in the pharmaceutical and/or cosmetic industries. Thus, the manufacturers of paraffins were required to raise the degree of purity of their products.

Presently large amounts of normal hydrocarbons are obtained via urea adducts according to the Edeleanu process. Initially, this process was used for dewaxing crude oil products, gas oil and spindle oil for producing low-pour oils; later on, it was further developed and modified to permit the production of pure normal hydrocarbons. In another industrial process molecular sieves are employed for the recovery of pure n-paraffins. The commercial molecular sieve processes may be divided into two groups, namely: gas phase and liquid phase processes. These processes include three process steps: adsorption, freeing the molecular sieve from adherent hydrocarbons which are not of the n-paraffin type subsequent to the adsorption step, and desorption. The desorption process is slower than the adsorption process and, therefore, should be as short as possible with respect to the efficiency of the unit. A variety of desorption techniques is known for use in units being operated with molecular sieves.

The paraffins contained in the gas oil and lubricating oil fractions are separated therefrom in order to improve the low-temperature characteristics of the products produced from said fractions. The fractions are dewaxed mainly by precipitating the paraffins at low temperatures with the aid of solvents such as benzene plus methyl ethyl ketone, propane, and dichloroethane plus dichloromethane. The separated paraffin still contains large amounts of oil and is called slack wax. These slack waxes contain between 3 and 30 percent of oily components, the oil being removed by sweating or by solvent de-oiling. Finally, the slack waxes are refined by treating them with bleaching earth; a more effective, though costly, procedure is, however, to pretreat them with concentrated or fuming sulfuric acid and then with bleaching earth.

German Offenlegungsschrift No. P 22 52 305.3 discloses a process for the production of n-paraffins useful as starting materials for petroleum fermentation products for use in foodstuff on animal feed wherein the carcinogenic aromatic hydrocarbons have been removed and wherein the n-paraffins containing less than 0.1 ppm of benzo ($\alpha$) pyrene are subjected to an adsorption treatment. Alumina having a particle size of from 8 to 100 mesh, a surface area above 100 square meters per gram and a $SiO_2$ content of below 15 weight percent is used as the adsorbent. The adsorption step is followed by the desorption step in which the hydrocarbons retained on the adsorbent are desorbed. The method of regeneration through solvent treatment, steam treatment and drying at temperatures of from 220° to 250°C, which has been proposed in order to permit repeated use of the adsorbing media, involves heavy stress on the adsorption media as far as their structure is concerned, resulting in a shorter lifetime of these media.

U.S. Pat. No. 3,409,691 proposes to separate polar organic materials from less polar materials by sorption with a solid sorbent, using as the sorbent a dry macroporous cation exchange resin or a metal salt thereof having a specific surface area of at least 20 square meters per gram. As polar organic materials which are separated from an aliphatic hydrocarbon, the U.S. patent specification mentions alcohols, aldehydes, ketones, ethers, mercaptans, chlorinated hydrocarbons, olefins, and aromatic hydrocarbons. The patent specification does not teach, however, whether and how the purification of slack waxes existing in semi-solid to solid form at normal temperature can be performed. Neither does this patent disclose a technique whereby the process may be performed on a continuous basis acceptable for commercial use.

When n-paraffins are purified according to conventional methods, there occur more or less large amounts of spent bleaching earth and acid resins the disposal of which only raises costs, since one cannot dispose of these materials at the usual waste pits for reasons of protection of environment. If the n-paraffins are purified using silica gel or alumina, the loading capacity is relatively limited and the desorption step and subsequent re-use of the regenerated adsorbents are possible only at considerable costs. Finally, cation exchange resin was found to be unsuitable when used for removing concomitant impurities, especially traces of aromatic substances, from the n-paraffin mixtures in the batch procedure described in the above-mentioned patent specification.

SUMMARY OF THE INVENTION

We have found that aromatic compounds can be removed from slack waxes by means of a macroporous metal ion loaded cation exchange resin in a continuous process involving successive steps of adsorption, purge, desorption and purge.

DESCRIPTION OF THE PREFERRED EMBODIMENTS

Surprisingly, it has been found that a continuous process for the purification of slack waxes, resulting from the urea or solvent dewaxing processes, can be provided, especially for the removal of aromatic compounds therefrom, and in which macroporous cation exchange resins are used, said process being characterized by a. treating a slack wax with a macroporous dehydrated cation exchange resin loaded substantially completely with metal ions, at a temperature above the melting point of said slack wax, b. subsequently purging the resin with a hydrocarbon, c. desorbing the compounds adsorbed on the resin with a polar solvent, d. washing the resin with a hydrocarbon to free it from the solvent, and e. providing the resin for re-use.

According to the invention, the aromatic compounds are removed from n-paraffins containing small quantities of aromatic compounds by using as an adsorbent, cation exchange resins comprising sulfonated styrene-divinylbenzene copolymers having surface areas and pore volumes within certain defined limits. The surface area and pore volume may be determined in simple manner after the following pretreatment:

Method A:

1. Twenty grams of cation exchange resin are suspended in 150 ml of distilled water at ambient temperature and stirred several times. Thereafter, the resin is allowed to settle, and supernatant water is decanted.

2. Step (1) is repeated with 200 ml distilled water.

3. By means of a Buchner funnel the water-wetted resin is freed from adherent water, it is then pre-dried under vacuum conditions for ten minutes.

4. The pre-dried resin is dried under vacuum conditions in a porcelain dish for about 12 hours at about 80°C.

Method B:

1. Thirty grams of cation exchange resin are pretreated according to Method A, Steps 1 through 3.

2. The so pretreated resin is transferred to a glass tube having an inside diameter of 2.54 cm and closed at the bottom with a coarse fritted glass support, and successively elutriated with 500 ml of pure methanol, 3. then with 500 ml of pure benzene and, finally, with 4. 500 ml of pure isooctane.

5. thereafter, it is transferred to a porcelain dish and vacuum dried for about 12 hours at about 80°C.

After these pretreating measures the specific surface area of the resin samples is determined according to the BET method (cf. JACS 60 (1938), pp. 309 through 319 and 59 (1937), pp. 1553 through 1564 and 2682 through 2689). Furthermore, the pore volume of the samples is determined as the difference between the grain and skeletal volumes, according to the mercury-water method. By grain volume is meant the volume of mercury displaced by 1 gram of the resin sample; by skeletal volume, the amount of water displaced by the aforesaid amount of the resin sample.

It has been shown that gel type resins have a specific surface area, s, of less than 1 m$^2$/g whereas typical macroporous resins have specific surface areas of greater than 1 m$^2$/g. Similarly, the pore volumes of gel type resins are less than 0.10 ml/g while the pore volumes of macroporous resins are greater than 0.10 ml/g. These values of specific pore areas, s, and pore volumes, v, are determined subsequent to pretreatment by either Method A or Method B discussed above.

Tests carried out with gel type cation exchange resins gave unsatisfactory results, that is, the yields of separated aromatic compounds were very low or there was no separation from the n-paraffin hydrocarbons at all. Again, if the gel type cation exchange resins were laden with metal ions such as $Ag^+$ or $Cu^+$ ions, it was shown that a separation of aromatic compounds from n-paraffin hydrocarbons was possible only to a small extent.

Surprisingly, it has now been found that the selectivity in the separation of aromatic compounds from slack waxes is particularly good when macroporous metal ion laden cation exchange resins are employed.

Gel type exchange resins have a pore volume of from about 0.003 to 0.004 cu. cm/cu. cm of resin and a pore diameter which is practically not measurable, whereas macroporous exchange resins have a pore volume greater than 0.1 cu. cm/cu. cm of resin, a measurable pore diameter and a large specific surface area. Convenient exchange resins include commercially available macroporous or macro-reticular cation exchange resins such as "Amberlite XE-284" (sulfonic acid type exchange resin) having a mean pore diameter of from about 40 to 50 A, a pore volume of from 0.35 to 0.50 cu. cm/cu. cm, a specific surface area of from about 570 to 580 square meter per gram and an exchange capacity of 3.3 milligram-equivalent/gram (dry basis), or the exchange resin "Amberlyst-15" having a mean pore diameter of about 270 A, a specific surface area of from about 40 to 60 square meter/gram. Preferred cation exchange resins according to the invention are those having a specific surface area of from 40 to 1000 square meter/gram, preferably from 500 to 750 square meter/gram, and a mean pore diameter of from 20 to 250 A, preferably from 40 to 60 A.

Suitable metal ions include those derived from the elements of Groups Ib through IVb, Ia and VIa through VIIIa of the Periodic System such as sodium, rhenium, platinum, cobalt, silver, copper, mercury, thallium or lead. The metal ions of silver, sodium, cobalt, copper or thallium are preferred. The exchange resin is loaded with ions in such an amount that, preferably, substantially all of the hydrogen ions are replaced. The hydrogen ions may be exchanged for metal ions in the well known method of treating the resin with a metal salt solution until the exchange is completed.

Macroporous cation exchange resins are utilized for the purification of n-paraffin hydrocarbon mixtures normally called slack waxes, to remove the aromatic compounds therefrom. Such slack waxes are obtained, for example, from urea dewaxing or cold dewaxing processes. They still contain about 0.001 to 5 weight percent aromatics, preferably 0.001 to 1 weight percent of aromatics, and their n-paraffin content ranges from 90 to 99 weight percent. The distribution of the n-paraffins depends on the starting material. Thus, gas oil being subjected to urea dewaxing yields a n-$C_{10}$-$C_{20}$ paraffin mixture with the major portion being n-$C_{17}$ paraffin, whereas urea-dewaxed spindle oil yields an n-$C_{14}$-$C_{28}$ paraffin mixture with n-$C_{20}$ paraffin forming the major portion of said mixture.

The process according to the invention leads to a nearly complete removal of aromatic compounds. In the sense of this invention, aromatic compounds mean the isocyclic and heterocyclic carbon compounds to which the Huckel rule may be applied, excluding, however, inorganic compounds which also are of an aromatic type, e.g., borazin. Examples of isocyclic carbon compounds are benzene and its derivatives, polynuclear aromatics such as naphthalene, anthracene, phenanthrene, polycyclic aromatics such as tetracene, pentacene, hexacene and the carcinogenic hydrocarbons derived from chrysene and pyrene, respectively, as well as, for example, aniline, nitrobenzene and phenol. Examples of heterocyclic carbon compounds include pyridin, furan, thiophene, quinoline and phenanthroline.

The purification of the n-paraffin mixtures is carried out in the following manner: the n-paraffin mixtures are charged in liquid phase to a column filled with the macroporous cation exchange resin, the feedstream being directed preferably from the bottom to the top of the column. In order to ensure a homogeneous cross-sectional loading of the column and a continuous discharge of the feedstream, care is taken to heat the adsorption column over its entire length. To maintain the charge stock in a liquid phase throughout the column, heat is applied to the column to achieve a temperature above the melting point of the feed and to maintain a constant viscosity throughout the column. As a result of the large loading capacity of the macroporous cation exchange resins, measured as grams of aromatics per gram of resin, it is possible to achieve, for each pass, a substantially complete removal of aromatics from the feedstream passing through the column.

In the second step of the purification process the column is purged with a light hydrocarbon; it has been shown to be advantageous to utilize lower paraffin hydrocarbons having from 5 to 10 carbon atoms such as hexanes, heptanes or octanes. The temperature in this step ranges from 20° to 200°C, preferably from 20° to 150°C. After purging the column in order to displace residual feed materials the aromatics retained on the resin are removed therefrom by a polar solvent. Suitable solvents include compounds such as alcohols, ethers or ketones, preferably dioxane, acetone, methylisobutylketone or methylethylketone. The boiling ranges of the purge and desorption media should be sufficiently far apart from each other that these media may be separated by distillation. Following desorption the column is purged a second time with a light hydrocarbon, preferably the same hydrocarbon used in the first purge, so as to permit the resin to be reused in the process. The temperatures employed in the displacement step and second purge step are approximately equal and correspond to those employed in the first purge step.

The following examples demonstrate the process of this invention.

EXAMPLE I 65 grams of the acidic cation exchange resin "Amberlite XE 284" in the $H^+$ form (manufactured by Rohm & Haas) were rinsed free of ion contamination with 200 ml of distilled water. The so pretreated resin was loaded in the usual manner with silver ions by charging a $AgNO_3$ solution to a column filled with this cation exchange resin ($H^+$ form) and purging with said $AgNO_3$ solution until the $Ag^+$ showed the same concentration in the eluate as was present in the charge to said column. After removing the excess silver ions by rinsing with water, the resin was stirred twice with 100 ml of methanol for 15 minutes, thereafter decanted, and dewatered with n-hexane.

15 grams of the dried resin ($Ag^+$ form) comprised a metal ion loading of 26 percent by weight of Ag, based on dry resin. The resin was employed as an adsorbent in a conventional chromatographic column. The column was heated to a temperature of 70°C. Slack wax was introduced into the bottom of the column and passed upward therethrough at a rate of 5 ml/hr. per 25 ml of resin. The slack wax feed had been obtained by a one-stage dewaxing using urea solution and dichloromethane from a spindle oil 0 derived from an Amna crude oil. The analysis of the slack wax was as follows:

| | |
|---|---|
| Density, gram/ml, at 70°C | 0.769 |
| Sulfur (total), mg/kg | 36 |
| Solidification point, °C | 48 |
| Aromatic content, wt.% (FIA/UV) | 0.193 |
| n-Paraffin content, wt.% (GC) | 95.0 |
| C-Distribution of paraffins, wt.%: | |
| $C_{18}-C_{20}$ | 1.2 |
| $C_{21}$ | 2.6 |
| $C_{22}$ | 7.8 |
| $C_{23}$ | 14.2 |
| $C_{24}$ | 19.5 |
| $C_{25}$ | 17.7 |
| $C_{26}$ | 14.3 |
| $C_{27}$ | 9.3 |
| $C_{28}$ | 6.4 |
| $C_{29}$ | 3.4 |
| $C_{30}$ | 2.4 |
| $C_{31}+$ | balance |

Up to the point when the aromatics were breaking through, the purity of the slack wax in accordance with DAB VII (Deutsche Aerztebuch VII — German Manual for Pharmacists and Pharmaceutical Industry) was guaranteed; the loading amounted to 12 percent by weight of aromatics per gram of resin.

Breaking through of aromatics was determined in accordance with DAB VII by charging 0.5 grams of the purified slack wax to a 50 ml measuring flask, dissolving the purified slack wax with isoctane while slightly heating the same, and filling it up to the mark. A 2 cm quartz cuvette was then filled with the specimen and measured against isooctane at 360 to 260 nm. Where the extinction coefficients exceeded the following values:

| | | |
|---|---|---|
| $E_{275}$ nm | = | 0.60 |
| $E_{295}$ nm | = | 0.30 |
| E above 310 nm | = | 0.10 | aromatic break-through occurred.

The column was freed from paraffins by purging with n-hexane and, subsequently, the aromatics were desorbed with 800 ml of dioxane at 50°C. Finally, the column was once again purged with n-hexane, the excess hexane was removed by suction, and the resin was dried over $P_2O_5$ at 110°C and 12 Torr for 4 hours.

EXAMPLE II

The resin of Example I was now employed for purifying a slack wax at a temperature of 70°C. The slack wax has been obtained by treating a spindle oil 0, derived from an Arabian light crude oil, with two portions of urea solution and dichloromethane. The analysis of the slack was was as follows:

| | |
|---|---|
| Sulfur (total), mg/kg | 494 |
| Aromatic content, vol. % (FIA/UV) | 1.22 |

| | |
|---|---|
| -continued | |
| Solidification point, °C | 37.5 |

A loading of aromatics on the resin amounting to 12.8 percent by weight per gram of resin was obtained before the aromatics broke through in the effluent. For regenerating the resin, the resin was purged with 250 ml of heptane, desorbed with 350 ml methylisobutylketone (MIBK) at a flow rate of 20 ml/hr., and then the desorbent was displaced by purging with 100 ml of heptane. The purge steps and the desorption step were each conducted at 70°C. Then the resin was dried as in Example I.

EXAMPLE III

The slack wax of Example II was once more purified with the cation exchange resin ($Ag^+$ form) used in the preceding examples, the flow rate of said slack wax being 6 ml/hr. per 25 ml of resin; thus obtaining a loading of 12.5 wt. % of aromatics per gram of resin. The stages of regeneration at 70°C were such that purging was done with 200 ml of n-heptane, desorption with 330 ml of MIBK at a MIBK rate of 20 ml/hr., and the MIBK was displaced by 100 ml of n-heptane.

EXAMPLE IV

Without the resin being dried, i.e., immediately after the resin was purged with heptane to remove the MIBK in Example III, fresh slack wax feed of Example II was introduced into the column of Example III. At the point of break-through of the aromatics in the effluent, a resin loading amounting to 13 wt. % of aromatics per gram of resin was obtained.

We claim:

1. A process for the purification of slack wax containing aromatic compounds which comprises the following steps:
   a. contacting an aromatic-containing slack wax in the liquid phase with a macroporous, metal ion loaded, cationic exchange resin at a temperature above the melting point of the slack wax whereby aromatics are adsorbed by the resin,
   b. contacting the resin with a paraffinic hydrocarbon whereby residual quantities of the slack wax charge are displaced,
   c. contacting the resin with a polar organic solvent whereby the adsorbed aromatics are desorbed, and
   d. contacting the resin with a paraffinic hydrocarbon whereby residual quantities of the polar organic solvent are displaced.

2. A process according to claim 1 wherein the macroporous cation exchange resin has a specific surface area greater than about 40 $m^2/g$ and a mean pore diameter of less than about 250 A.

3. A process according to claim 2 wherein the macroporous cation exchange resin has a specific surface area of about 50 to 1000 $m^2/g$ and a mean pore diameter of about 20 to 250 A.

4. A process according to claim 1 wherein the metal ions of the macroporous cation exchange resin are selected from the group consisting of Groups Ib to IVb, Ia and VIa to VIIIa of the Periodic Table.

5. A process according to claim 4 wherein the metal ions are selected from the group consisting of sodium, rhenium, platinum, cobalt, silver, copper, mercury, thallium and lead.

6. A process according to claim 5 wherein the metal ions are selected from the group consisting of sodium, cobalt, silver, copper and thallium.

7. A process according to claim 6 wherein the metal ion is silver.

8. A process according to claim 6 wherein the metal ion is copper.

9. A process according to claim 1 wherein the slack wax being purified contains 0.001 to 5 weight percent of aromatics.

10. A process according to claim 1 wherein the paraffinic hydrocarbon of step (b) is a $C_5$ to $C_{10}$ paraffinic hydrocarbon.

11. A process according to claim 1 wherein the paraffinic hydrocarbon of step (d) is a $C_5$ to $C_{10}$ paraffinic hydrocarbon.

12. A process according to claim 1 wherein the paraffinic hydrocarbons of steps (b) and (d) are the same.

13. A process according to claim 12 wherein the paraffinic hydrocarbon is selected from the group consisting of n-hexane and n-heptane.

14. A process according to claim 1 wherein the polar organic solvent of step (c) is selected from the group consisting of alcohols, ethers and ketones.

15. A process according to claim 14 wherein the polar organic solvent is selected from the group consisting of dioxane, acetone, methylisobutylketone and methylethylketone.

16. A process according to claim 1 wherein the operating temperatures of steps (b), (c) and (d) are from 20° to 200°C.

* * * * *